United States Patent [19]

Hess

[11] 4,005,757
[45] Feb. 1, 1977

[54] CLAMP SHANK DEVICE

[76] Inventor: Mitchell J. Hess, Plymouth, Utah 84330

[22] Filed: Mar. 10, 1975

[21] Appl. No.: 556,676

[52] U.S. Cl. .............................. 172/710; 172/748
[51] Int. Cl.² ..................................... A01B 61/04
[58] Field of Search .......... 172/261, 264, 265, 269, 172/643, 657, 705, 706, 707, 708, 709, 710, 748

[56] References Cited

UNITED STATES PATENTS

| 2,771,018 | 11/1956 | Zahn | 172/710 |
|---|---|---|---|
| 3,031,019 | 4/1962 | Gysler | 172/710 |
| 3,098,531 | 7/1963 | Hunter | 172/710 |
| 3,470,966 | 10/1969 | Padwick | 172/710 |
| 3,480,086 | 11/1969 | Groenke | 172/710 |
| 3,744,572 | 7/1973 | Zeltwanger et al. | 172/710 |

FOREIGN PATENTS OR APPLICATIONS

| 248,520 | 12/1963 | Australia | 172/710 |

Primary Examiner—Richard T. Stouffer
Attorney, Agent, or Firm—Mallinckrodt & Mallinckrodt

[57] ABSTRACT

A clamp shank device designed particularly for attaching a chisel type of plowshare, cultivator blade, or the like to the draft frame of an agricultural implement includes a resiliently-biased clamping arrangement confining a shank member against lateral tipping movement but permitting it to ride up and over obstructions. The shank member is rectangular in cross-section and has a forward, horizontal, attachment portion rigidly held flatwise against the upper face of a rocker plate whose rearward end is beveled downwardly and forwardly to provide an upper pivot edge across the width of the plate. Such pivot edge is received by and extends along the vertex of a forwardly and downwardly facing angle included between the steps of a bottom-stepped rear wall of a supporting frame that is adapted to be attached to and beneath a tool-carrying member of the implement draft frame. The rocker plate is spring-biased upwardly at its forward end toward a top wall of the supporting frame and is free to move downwardly at that end against spring tension while pivoting against the frame on and along the pivot edge of its rearward end, within the vertex of the receiving, included angle of the frame. Any tendency toward lateral tipping of the shank during normal working conditions is minimized by a cinching clamp at the rearward end of the frame.

10 Claims, 6 Drawing Figures

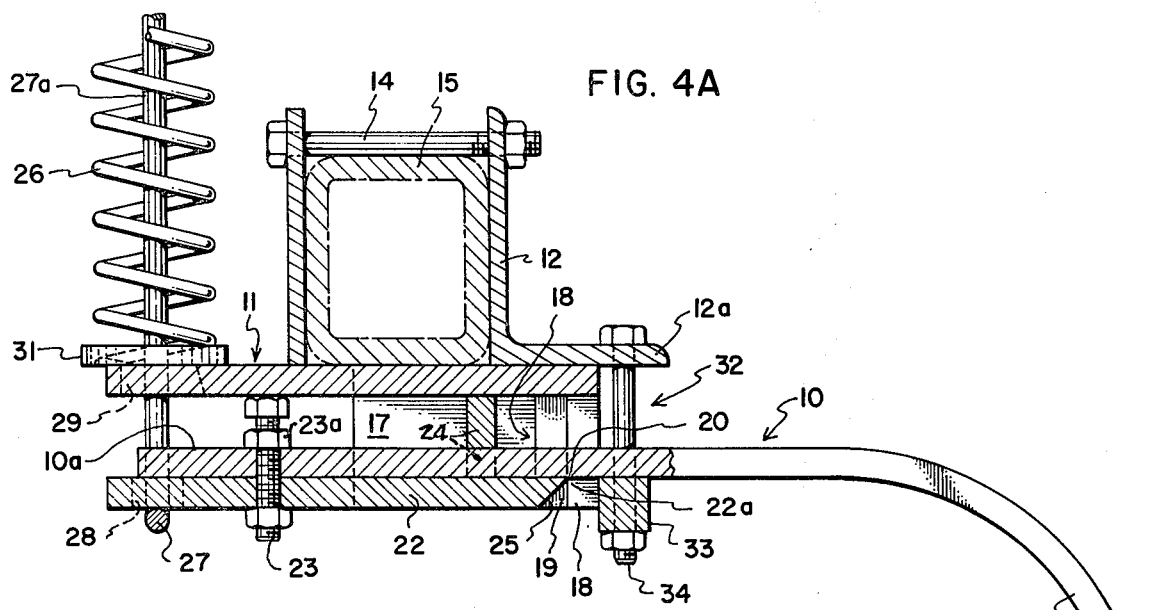
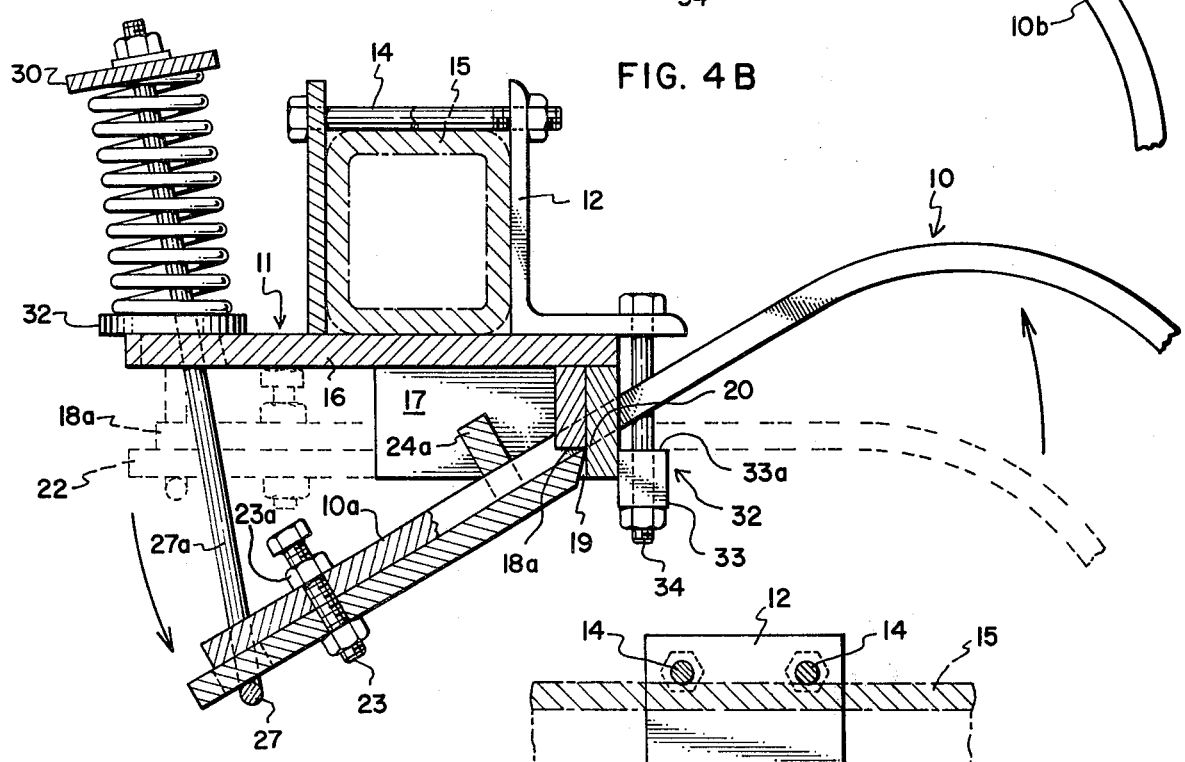
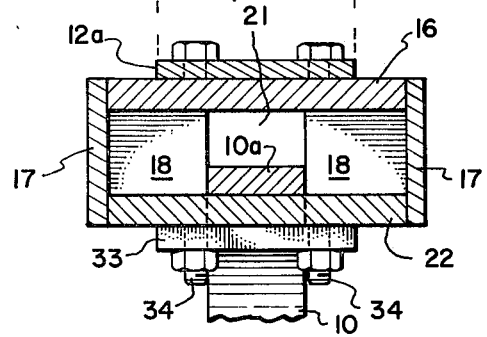

CLAMP SHANK DEVICE

BACKGROUND OF THE INVENTION

1. Field

The invention is in the field of clamping devices for attaching earth working tools to draft frames of agricultural implements used in the plowing, cultivating, or other working of crop farm land.

2. State of the Art

Devices of the type concerned are common. One type, particularly adapted for so-called "chisel plow", is particularly susceptible to lateral displacement of the plowshare shanks and to wear of attachment clamping members by reason of the normal resistance of the ground and especially of unyielding obstructions, such as large stones, to the plowshares carried at the ends of downwardly and forwardly curved working portions of the respective shank members that penetrate deeply into the soil. Forward portions of the shank members are substantially horizontal in their attachment to the draft frame of the plow. Efforts have been made to minimize such lateral displacement and wear, but considerable room has been left for improvement.

SUMMARY OF THE INVENTION

The present invention is primarily concerned with improving lateral stability and resistance to wear of clamping members arranged in combination with a shank member in a clamp shank device of the type shown in Gysler U.S. Pat. No. 3,031,019. To this end, the forward, horizontal, attachment portion of the shank member of such a device is rigidly held flatwise against the upper face of a rocker plate, whose rearward end is beveled downwardly to provide an upper pivot edge along the width of the plate. Such pivot edge is received by and extends along a forwardly and downwardly facing angle included between the steps of the inwardly stepped bottom of a rear wall of a supporting frame designed for attachment to and beneath a tool-carrying member of the implement draft frame. The rocker plate is spring-biased upwardly at its forward end by the usual pair of heavy springs held in place by the usual U-bolt, and is free to move downwardly at that end against the spring tension while pivoting along its beveled rearward end on the upper pivot edge thereof and against the frame within the vertex of the receiving, included angle of the frame. Spacer means, preferably in the form of an upstanding bolt which contributes to the fastening of the shank member to the rocker plate, positions such rocker plate so its pivot edge fits into the vertex of the included angle of the frame in the normal working position of the shank member. A cinching clamp at the rearward end of the frame reduces to a bare minimum any tendency toward lateral tipping of the shank during normal working conditions. Since the pivot edge provides a single, positionally fixed bearing for pivotal movement of the rocker plate, wear is practically non-existent.

THE DRAWINGS

The best mode presently contemplated of carrying out the invention is illustrated in the accompanying drawings, in which:

FIG. 1 is a top plan view of a chisel plow clamp shank constructed in accordance with the invention, the rearward extremity of the shank to which the plowshare is attached being broken away for convenience of illustration;

FIG. 2, a side elevation;

FIG. 3, a bottom plan;

FIG. 4A, a longitudinal vertical section partly in elevation as taken along the line 4A—4A of FIG. 1;

FIG. 4B, a corresponding view taken along the line 4B—4B of FIG. 1 during operation when the shank and clamp have reacted to an unyielding obstruction encountered by the plowshare; and FIG. 5, a transverse vertical section taken along the line 5—5 of FIG. 2.

DETAILED DESCRIPTION OF THE ILLUSTRATED EMBODIMENT

Figure 1:
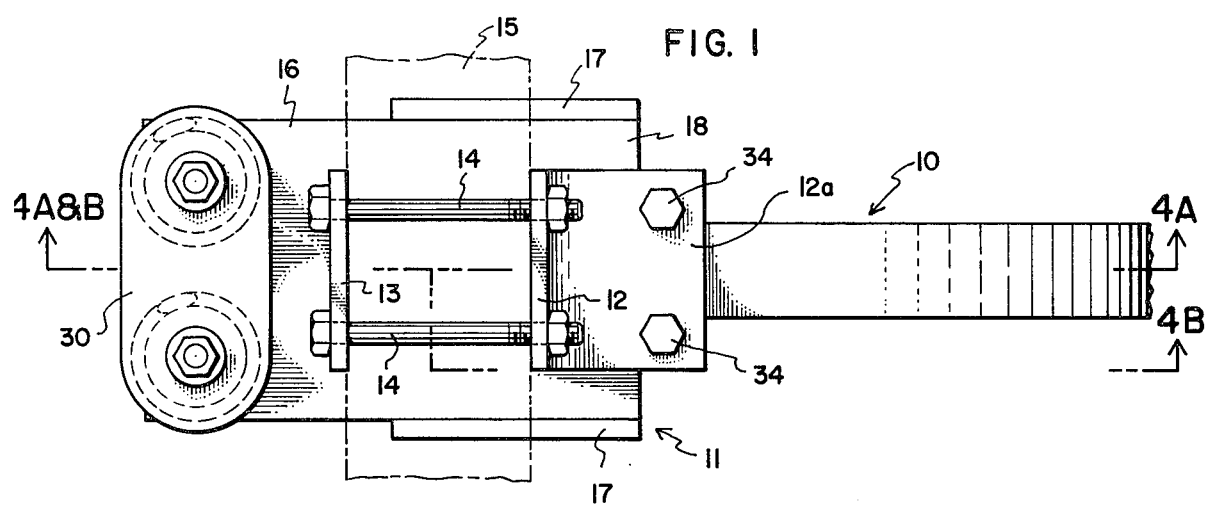

As illustrated, a shank member 10, rectangular in cross section and having a substantially horizontal, forward, attachment portion 10a and a downwardly-extending rear portion 10b, is rigidly held in a frame 11 that is adapted, as by means of upstanding plate members 12 and 13 and bolts 14, for secure attachment to a receiving member, indicated at 15, of the draft frame (not otherwise shown) of a chisel plow implements for agricultural use.

Frame 11 comprises a rectangular top wall 16, relatively short side walls 17, respectively, and a rear wall 18, which is transverse to shank member 10 and is stepped upwardly from its bottom along its length and interiorly of frame 11 to define a forwardly and downwardly facing, included angle 19 having a vertex 20. Such stepped rear wall is notched upwardly from its bottom intermediate its length, see particularly FIG. 5, to provide space 21 for accommodating shank member 10 and upward movement thereof in any oscillation about vertex 20 as a center. The several members of such frame 11 are preferably cut to shape from heavy steel plate and welded together to provide a very strong and rigid support for shank member 10.

The forward, substantially horizontal portion 10a of shank member 10 is positioned flatwise against the upper surface of a rocker plate 22 so as to extend along the length and intermediate the width thereof. It is hold tightly to rocker plate 22, as by means of a bolt 23 and a bridging member 24 that is tightly secured to the rocker plate by welding.

The rearward end of rocker plate 22 is beveled downwardly and forwardly along its length, as at 25, FIG. 4A, to form an upper pivot edge 22a across the width of such rocker plate.

As rigidly associated in the manner described, the rocker plate 22 and thereto attached portion of shank member 10 are positioned within and supported by frame 11, the shank member being received by notch space 21, as indicated in FIG. 5, and the beveled rearward end of rocker plate 22 being received by the included angle 19 of the stepped bottom of rear wall 18 of the frame.

Spacer means is provided between shank member portion 10a and the underface of top wall member 16 of frame 11, so as to position pivot edge 22a of rocker plate 22 in the vertex 20 of included angle 19. In the present embodiment, such spacer means is provided by the upper portion of bolt 23, a lock nut 23a providing for spacing adjustment. It should be noted that the bridge 24a of bridging member 24 and the legs thereof closely hug the shank member, but could be shorter than shown since they are not spacers.

Although the described arrangement is much preferred, the spacer means could be provided in various ways, as for example by means of a block or bar of suitable dimension secured to the undersurface of frame top wall 16, or even by making such frame top wall of sufficient thickness to provide the required spacing. In such arrangements, other means could be used to replace the bridging securement of member 24, or shank member 10 could be welded to rocker plate 22.

Figure 2:
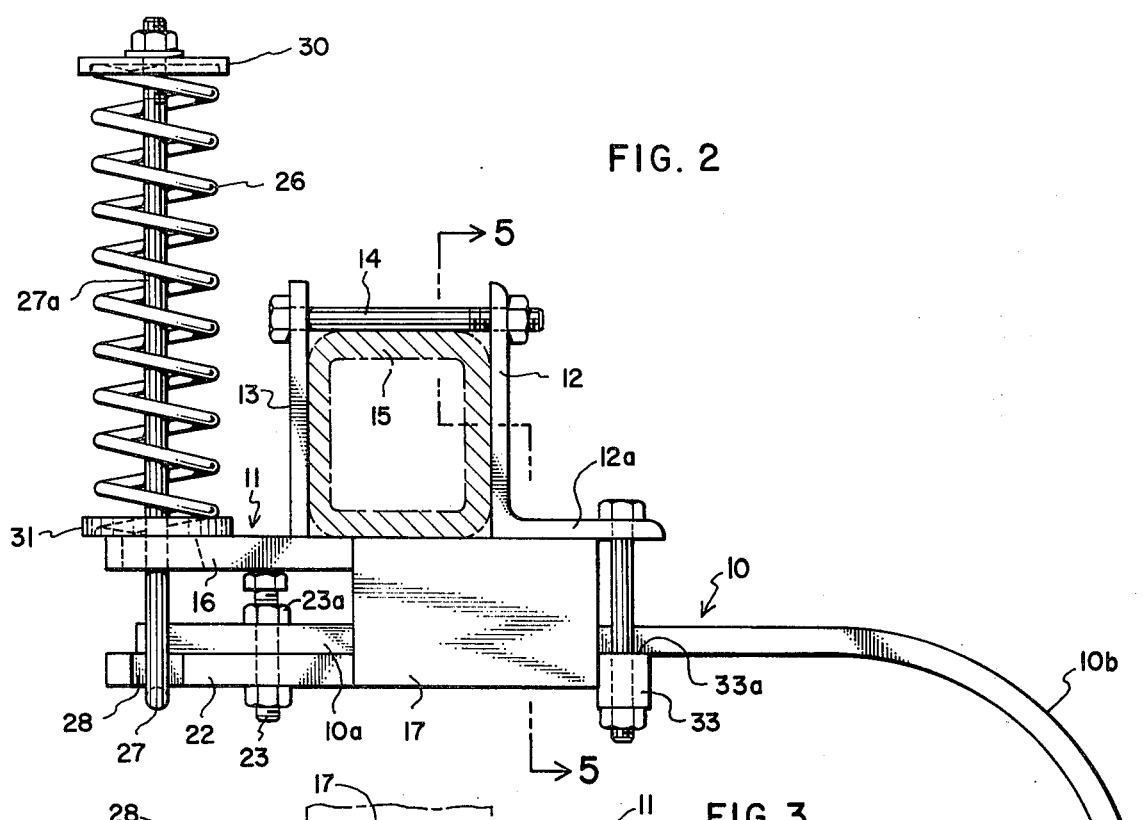
Figure 3:
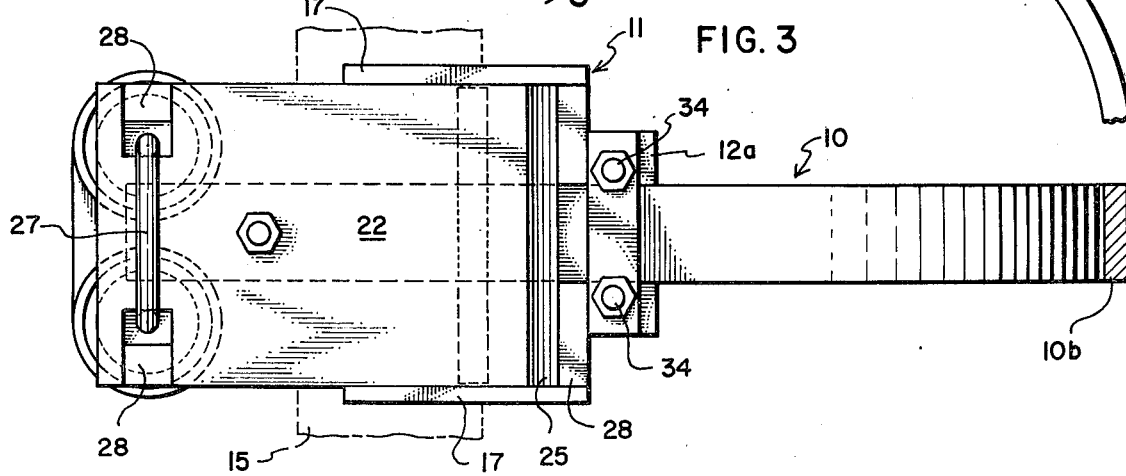

Shank member 10 is normally resiliently held in the working position of FIGS. 2 and 4A by the usual pair of heavy coil springs 26 encircling the upstanding legs 27a, respectively, of the usual U-bolt 27, which are passed through respective sets of recesses 28 and holes 29 in the forward ends of rocker plate 22 and frame top wall 16, respectively, and are capped by a reaction plate 30 for the springs. It is preferred that cups 31 be secured, as by welding, to the upper surface of frame top wall 16 for receiving the lower ends of the respective springs.

The rearward plate member 12, upstanding from securement to the upper surface of frame top wall 16, is preferably a short length of a structural steel angle, as shown in FIG. 4A, positioned so that its horizontal leg 12 a overhangs the rear end of frame 11 and a portion of shank member 10 that is emergent from the confines of the frame. As such, leg 12a provides a reaction member of a cinching clamp 32, which additionally comprises a lower clamping member 33 in the form of a heavy bar which bears upwardly against shank member 10 when the bolts 34 of the clamp are tightened. The cinching action of clamp 32 minimizes any tendency for shank member 10 to tip at one side or the other. This is by reason of the constraint imposed by upper step surface 18a against upward movement of the rearward end of rocker plate 22, in combination with the restraint imposed by the upper surface 33a of clamping member 33 against downward movement of the shank member during normal working of the soil.

As can be seen from FIG. 4B, when an unyielding obstacle such as a large stone is encountered by a plowshare, breakage of the shank member 10 is prevented by yielding of springs 26 to the great force imposed thereon during continued forward movement of the implement. The dependent rear portion 10b of the shank member, which is usually curved to point forwardly at its lower terminus carrying the plowshare tends to ride over the obstruction by moving upwardly against the spring bias of its forward 10a. Such rise is accommodated by space 21 above the shank member in rear wall 18, and the rocker plate 22 and its thereto attached portion of the shank member pivot along the pivot edge 22a of such rocker plate in the included angle vertex 20 as an axis. Since the pivot bearing is strictly along the pivot edge line and the vertex line within such vertex 20, wear is practically non-existent.

Whereas, this invention is here illustrated and described with respect to a preferred specific embodiment thereof, it should be understood that various changes may be made within the inventive concepts pointed out in the claims that follow.

I claim:

1. A clamp shank device comprising a shank member rectangular in cross-section and having a substantially horizontal forward portion and a downwardly-extending rear portion; a supporting frame having a top wall and a transverse rear wall depending from said top wall across the width thereof, said rear wall being stepped upwardly from its bottom along its length on the portion thereof facing the interior of the frame to define a forwardly and downwardly facing, included angle, and being deeply notched upwardly from its bottom intermediate its length to receive said forward portion of the shank member and to accommodate upward movement thereof; a rocker plate positioned within the supporting frame below said top wall thereof, the rearward end of said plate being a surface inclined downwardly and forwardly from the upper edge to the lower edge thereof, said upper edge forming a pivot edge across the width of the plate which abuts and pivots against the portion of said rear wall defining vertex of said included angle; means rigidly holding said forward portion of the shank member flatwise against the upper surface of the rocker plate intermediate the width thereof; and spring means normally resiliently urging the forward end of the rocker plate and the thereto attached portion of the shank member upwardly toward the top wall of said frame, whereby excessive rearward pressure against said downwardly extending rear portion of the shank member will tend to pivot said forward end of the rocker plate and the thereto attached portion of the shank member downwardly against the urge of said spring means and about said pivot edge as an axis.

2. A clamp shank device according to claim 1, wherein the means holding the shank member to the rocker plate includes a transverse member bridging and closely hugging the shank member and secured to the rocker plate adjacent to the rearward end thereof.

3. A clamp shank device according to claim 2, wherein cinching clamp means is provided for the shank member at the emergence thereof from the frame, said cinching clamp means comprising a cinching member, a reactiion member rigid with said frame, and means for adjustably connecting the cinching member to the reaction member.

4. A clamp shank device according to claim 3, within upstanding, mutually spaced, attachment plates are secured to the top wall of the frame for securing said device to the draft frame of an agricultural implement, one of said plates being of structural angle formation and rearwardly placed with a leg of the angle secured flatwise against said top wall and overhanging the rear end of the frame and the shank member, said leg constituting the reaction member of the clamping means.

5. A clamp shank device according to claim 3, wherein the cinching member has an upper face bearing flatwise against the lower face of the shank member, and the reaction member is above the shank member.

6. A clamp shank device according to claim 1, wherein cinching clamp means is provided for the shank member at the emergence thereof from the frame, said cinching clamp means comprising a cinching member, a reaction member rigid with said frame, and means for adjustably connecting the cinching member to the reaction member.

7. A clamp shank device according to claim 1, wherein the frame also has side walls adjoining the rear wall and extending forwardly therefrom.

8. A clamp shank device according to claim 1, adapted for rigid attachment to the draft frame of a chisel plow implement, the shank member being a chisel plow plowshare shank.

9. A clamp device according to claim 1, wherein spacer means is provided above the forward portion of the shank member within the frame for insuring positioning of the upper surface of the inclined rearward end of the rocker plate flatwise against the step undersurface of the rear wall of the frame.

10. A clamp device according to claim 9, wherein the spacer means is the upper portion of the bolt that constitutes part of the means for rigidly holding the shank member against the rocker plate.

* * * * *